United States Patent [19]

Mitchell et al.

[11] 4,009,291

[45] Feb. 22, 1977

[54] COLD WATER SOLUBLE STABLE BULKED STARCH

[75] Inventors: William A. Mitchell, Lincoln Park, N.J.; William C. Seidel, Monsey; George E. Orozovich, Flushing, both of N.Y.

[73] Assignee: General Foods Corporation, White Plains, N.Y.

[22] Filed: Mar. 25, 1974

[21] Appl. No.: 454,055

[52] U.S. Cl. .............................. 426/548; 426/613; 426/658; 426/661; 127/32; 127/38; 127/70

[51] Int. Cl.$^2$ ......................................... A23L 1/195

[58] Field of Search .......... 426/215, 217, 380, 201, 426/548, 661, 658, 613; 127/38, 70, 32, 33; 195/31 R

[56] References Cited

UNITED STATES PATENTS

| | | | |
|---|---|---|---|
| 3,320,074 | 5/1967 | Gebhardt | 426/380 X |
| 3,505,110 | 4/1970 | Kesler et al. | 260/233.3 R |
| 3,563,798 | 2/1971 | Germine et al. | 426/661 X |
| 3,582,350 | 6/1971 | Werbin et al. | 426/215 X |
| 3,583,874 | 6/1971 | Germino et al. | 426/215 X |
| 3,642,491 | 2/1972 | Schlatter | 426/548 |
| 3,653,922 | 4/1972 | Schmitt et al. | 425/380 |
| 3,753,739 | 8/1973 | Cella et al. | 426/215 |
| 3,786,159 | 1/1974 | Sato et al. | 426/380 X |

*Primary Examiner*—A. Louis Monacell
*Assistant Examiner*—Esther L. Massung
*Attorney, Agent, or Firm*—Richard Kornutik

[57] ABSTRACT

A starch composition having lower hydroscopicity, lower bulk-density and better film-forming and holding properties than low D.E. dextrins comprising granule starches which have been hydrolyged to a D.E. of less than about 1 with little or no reducing sugars being present while retaining their granule structure and have thereafter been gelatinized.

16 Claims, No Drawings

COLD WATER SOLUBLE STABLE BULKED STARCH

BACKGROUND OF THE INVENTION

The present invention relates to a modified granule starch which when gelatinized produces a starch having properties superior to the best non-hazing dextrins currently available. Specifically, the starch of this invention is low-hazing and has greater stability against moisture, greater film-forming properties and lower bulk density than the non-hazing low D.E. dextrins recently available from commercial starch manufacturers.

The term D.E. is an abbreviation for dextrose equivalent and is used herein to refer to the reducing value of dissolved solids in a starch derived material.

Recently, U.S. Pat. Nos. 3,756,853 and 3,756,919 were issued (Sept. 4, 1973) which teach processes whereby nonhazing low D.E. dextrins may be produced. These methods comprise first hydrolyzing a starch to a D.E. of from 20 to 43 and thereafter subjecting the resulting starch conversion syrup to either molecular exclusion or reverse osmosis until the D.E. of the syrup has been reduced to from 5 to 18.

The bulking agents of this invention are used as the aforementioned non-hazing dextrins but are starches as the D.E. of this material is less thab 1. The starches when first prepared are in the form of a granule starch which has been modified as by hydrolysis or by propoxylation and subsequent hydrolysis, in both instances the degree of modification being sufficient to derive a modified starch having a D.E. of less than 1. Such granule starch in itself is insoluble in cold water and must undergo a gelatinization step followed by drying before the improved product is produced. The method of this invention therefore not only provides a superior starch product, but the method itself is appreciably more simple than the separation steps referred to in the prior art.

These improved starches are bland, low in sweetness, hygroscopicity and bulk density and are readily soluble in water to produce a clear solution.

SUMMARY OF THE INVENTION

It has been found that when a granule starch which has been modified to a D.E. of less than 1 as by hydrolysis or about 0.5% propoxylation followed by hydrolysis, is gelatinized and thereafter dried, a starch is produced which is low-hazing and in most instances non-hazing, has lower bulk density, lower hydroscopicity, better film-forming properties and is at least comparably soluble in cold water to the best known low D.E. non-hazing dextrins. More particularly, when these modified low D.E. starches are either concurrently gelatinized and dried by drying at a temperature above about 65° C as by drum drying, spray drying or the like, or gelatinized in aqueous systems followed by known drying methods not necessarily exceeding about 65° C such as drum drying, spray drying, freeze drying or the like without concurrent chemical alteration the above desirable properties are produced.

The starches of this invention, therefore, find utility in any system or capacity in which the low D.E. non-hazing dextrins find commercial application in addition to systems in which the improved qualities of these starches would be of particular advantage. Examples of such extended usage would be as fixatives for increased amounts of acids, alcohols, fats or virtually any dry emulsion or flavor where, due to the lower bulk density and consequent increased surface area, fixation of larger amounts of the same is possible. Other applications include their use as carriers for low calorie sugar substitutes such as for non-nutritive sweeteners, for example, saccharine, cyclamates, and nutritive sweeteners such as dipeptide sweeteners, especially L-aspartyl-L-phenylalanine methyl ester or combinations thereof. In such instances exercising proper control over the gelatinization or bulking and drying process makes it possible to produce a final product which has the appearance and many of the physical properties of sucrose. In some instances, it is desirable to produce a sweetener having a bulk equivalent to that of sucrose; in other instances, it is desirable to select a bulk density such that the sweetening level of the low calorie sweetening composition will be equivalent to that of sucrose on a volume basis but will be appreciably lower in calorie content. Additional applications include use as carriers for flavor enhancers, a additives for coloring agents, as spray drying adjuncts for coffee extract or tea extracts, as bulking, bodying or dispersing agents in synthetic creams or coffee whiteners, as moisture retainer in breads, pastries, confection, meats, as bodying and smoothing agent in whipped dessert products, puddings, soups, desserts or the like. The basic starch material can also be co-dried with gums such as pectins, alginates, carrageenates and gelatin to produce powders with special cold water dispersibility and gelling properties. The starches of this invention also find utility in various pharmaceutical or cosmetic preparations.

Accordingly, it is the principal object of this invention to provide improved low D.E. starches which are low-hazing, and which have improved solubility, stability and bulk density properties over any known non-hazing dextrin.

It is another object of the invention to provide a process for improving the solubility, stability, bulk density and hazing properties of starches having a D.E. of less than about 1.

It is yet another object of the present invention to provide products in which the improved qualities of these starches are best demonstrated and put to use.

DESCRIPTION OF THE INVENTION

The initial starch for the purposes of this invention is a granule starch which has been partially modified as by hydrolysis or by propoxylation and hydrolysis to a D.E. of less than about 1 and which retains the granule structure of starch.

Granule starch is virtually insoluble in cold water and when gelatinized and dried disperses only slowly in water to produce a cloudy, high viscosity solution. Similarly, when the granule starch is treated with amylases, acid or heat under such conditions that only slight hydrolysis takes place, the granule in this case remains intact but on heating in the presence of water, a cloudy, relatively high viscosity solution is also derived. However, if the hydrolysis is allowed to go far enough, easily dispersible cold water soluble dextrins which render clear solutions in water are produced. These dextrins on the other hand contain reducing sugars which readily undergo the browning reaction in food preparations containing amino groups. In addition, these dextrins are very hygroscopic and readily agglomerate resulting in caking.

The detracting properties of these starches and dextrins prompted earlier researchers to determine methods of modifying a starch granule in such a way that the granule remains intact and yet when heated above a temperature of about 65° C, forms a clear, low viscosity solution.

The granule starch can be made by treating a waxy starch with the enzyme pullulanase. The hydrolysis is carried out only to the point that the D.E. is less than about 1 with little or no reducing sugars being present. Such a starch product is not soluble in water but can be employed as a low viscosity starch in cooking operations.

Alternatively, the basic granular starch material can be produced by the introduction of hydroxypropyl groups into the starch material by treatment with propylene oxide under alkaline conditions. This is accomplished by introducing the hydroxypropyl groups at about the 0.5% level accompanied by hydrolysis to a D.E. of less than about 1.

It has been found that these modified starches, that is, granule starches which have been hydrolysed to a D.E. of less than about 1, or propoxylated to about 0.5% and subsequently hydrolyzed to the same D.E. when gelatinized at temperatures above about 65° C and then dried as by drum drying, air-drying, vacuum drying, spray drying, freeze drying or the like, or dried at temperatures above about 65° C in order to effect a concurrent gelatinization and drying, a low viscosity, low bulk density water soluble starch having improved properties over the typical gelatinized starches and dextrins is produced. The improvements comprise bland taste, cold water solubility, ability to produce clearer solutions, lower hygroscopicity, and most significantly, an ability to hold at higher levels numerous types of food material such as fat, alcohol and liquid acids while still remaining a free flowing powder. In addition, these starches also demonstrate excellent emulsifying properties, and good handling qualities in terms of being stable to normal crushing pressure. All properties mentioned which are characteristic of all starches of the present invention are not believed to be possessed by any one known gelatinized starch or dextrin.

Gelatinization of the above modified starch according to this invention must be conducted by methods known in the art to render gelatinization of the starch which in no way effects any type of oxidation or chemical interaction such that modification of the starch molecule would result. "Gelatinization" as employed throughout consequently indicates gelatinization free of chemical interaction such as, for example, hydrolysis or oxidation. Therefore, some operable methods for effecting gelatinization of the modified low D.E. starch are drying at temperatures above about 65° C as by drum drying, spray drying or the like, and cooking in the pesence of water at above the gelatinization temperature of about 65° C, followed by known drying methods. In the former instance, there is no need to gelatinize the starch prior to introducing the same into the dryer due to the concurrent gelatinization and drying of the starch. Accordingly, this method is preferred.

It is not intended that this invention be restricted to the aforementioned methods of gelatinization but rather is intended to include those methods known in the art to be operative for the purpose of this invention. However, drum drying, preferably at temperatures sufficient to effect gelatinization, has been found to be preferable over the majority of methods which may be employed not only for economic reasons, but also because drum drying produces a superior product in terms of solubility, stability, bulk density and appearance.

Accordingly, the preferred embodiment of this invention is to gelatinize and by either spray or drum drying.

According to one embodiment of this invention a table sugar substitute having the appearance of crystalline sugar can be prepared by forming a uniform aqueous solution of a modified starch having a D.E. of less than about 1 with a dipeptide sweetener such as aspartyl phenylalanine methyl ester and drum drying this solution in a manner so as to yield an expanded product which may then, if necessary, be ground to any desirable dimension. For a sweet dry bulked product this usually means that the starch of this invention will have a bulk density of from about 0.04 g/cc to about 0.3 g/cc with a respectively proportionate L-aspartyl-L-phenylalanine methyl ester concentration of about 9.5% to about 1.2%, a bulk density of 0.08 g/cc with a respective sweetener concentration of 4.75% being preferred in terms of acquiring a product most like sucrose in terms of volume and the sweetness intensity associated therewith.

The processes of this invention are further illustrated but not limited by the following examples.

EXAMPLE I

A 50-50 mixture of slightly modified starch having a D.E. of less than about 1 was dispersed in water and drum dried at 80 psi drum pressure and at a drum speed of 3 rpm with a roll gap of 0.002 inches. The white crystalline appearing powder had a bulk density of 0.084 g/cc and was rapidly soluble in cold water to produce a clear, bland tasting solution.

EXAMPLE II

To 200 g of modified starch having a D.E. of less than about 1 was added 200 ml water and 7.0 g L-aspartyl-L-phenylalanine methyl ester (APM). This mixture was drum dried at 80 psi at a roll gap of 0.002 inches and a drum speed of 3 rpm.

A white crystalline-appearing, sugar-like powder was produced with a bulked density of 0.059 which was cold water soluble. A clear, sweet tasting solution resulted when the powder was dissolved in cold water.

EXAMPLE III

Ethanol, at a concentration of 70% by weight, was blended with 30% of the bulked product of Example I to produce a free-flowing powder. The product dissolved readily in cold water to produce a clear alcohol solution with no off-taste. The product remained free-flowing when examined after 3 months storage at room temperature.

The material was compared to a commercially available 5 D.E. dextrin known as "Mor-Rex" which was bulked according to the method of Example I. The Mor-Rex sample could only hold 60% by weight of the ethanol as compared to the improved bulked material which held about 70% ethanol.

EXAMPLE IV

The bulked material of Example I was dry blended to contain 40% acetic acid which produced a readily flowable mass that remained stable after 3 months storage in a sealed jar at room temperature.

EXAMPLE V

A 1 D.E. modified starch is gelatinized by drum drying at 80 psig at a roll gap of 0.002 inches and a drum speed of 3 rpm. The powder had a bulk density of 0.059 and was thereafter used to make a free-flowing cold water soluble phosphoric acid at 37.6% concentration which was prepared by dry mixing the 37.6% by weight of phosphoric acid with 62.4% by weight of the cold water soluble starch powder.

The phosphoric acid starch powder was stored at room temperature in a sealed jar and was found to be completely stable after 3 months.

EXAMPLE VI

Seventy percent by weight of the initial gelatinized low D.E. starch devoid of phosphoric acid of Example V was mixed with 30% by weight of vegetable oil and spray dried in a Niro Spray Dryer having an inlet temperature of 180° C and an outlet temperature of 65° C. A free-flowing dried emulsion was derived which demonstrated properties which would make it ideal as an encapsulation material for, as an example, flavor oils, water soluble flavors such as coffee oil and the like.

When co-dried with gums, novel textures, solubility and gelling properties are obtained.

EXAMPLE VII

A co-dried mixture of the starch of this invention and gelatin is prepared as follows:
240 g grocery grade gelatin and
160 g starch (D.E. less than 1) are dispersed in 2400 ml boiling water The gelatin/starch solution is drum dried at 80 psig and a drum setting of 0.05 inches at 4 rpm. The co-dried product is ground in a micro-grinder equipped with a 0.010 inch Herring Bone mesh screen.

7.5 g of the co-dried ground product [3:2 gelatin/starch] in place of gelatin alone is combined with a conventional amount of sweetening, coloring, flavoring and preservative ingredients of a gelatin dessert to give an overall gelatin/starch concentration of about 8 to 9% basis the dry weight product. A control was similarly prepared which contained an identical amount of gelatin (3:09) along with the same amount of sweetening, coloring, flavoring and preservation ingredients but was devoid of starch.

The gelatin/starch dessert mix and gelatin control dessert mix are each divided into three equal portions. Each successive sample was dissolved in water of 3 different temperatures in order to determine at what water temperature the dry product containing the co-dried starch/gelatin ingredient produces the best gelled final product and how this compared to a standard gelatin product.

| System | 10° C $H_2O$ | 20° C $H_2O$ | 30° C $H_2O$ |
|---|---|---|---|
| co-dried gelatin and starch | grainy | swollen gel particles. Slight points on surface of gel. | excellent clear gel |
| gelatin control | grainy; points on surface of gel. Settled out on bottom | grainy with points on the surface of gel. | slight points on surface of gel. not completely dissolved. |

As is evident from the above comparative study, the starch of this invention when co-dried with gelatin produces a gelatin composition which is completely soluble in water having the approximate temperature of hot tap water as compared to gelatin alone which requires boiling water for total solubility. Thus, the starch of this invention when co-dried with gelatin may be employed where an easier to prepare and quicker setting gelatin product is desired.

EXAMPLE VIII

A sample of the improved starch of this invention was prepared as follows:

A 30% slurry was made of a low viscosity waxy maize starch. To the slurry was added 8% sodium chloride and 5% propylene oxide basis the weight of the starch. Enough sodium hydroxide was added to bring the pH to about 10.8. The mixture was allowed to react for 24 hours at 25° C and subsequently hydrolyzed to a D.E. of less than 1.

TABLE I

Comparative Properties of Various Dextrins, Starches and Sugar

| Sample | Bulk density g/cc | Clarity in 1% $H_2O$ solution | Taste | Emulsifying Properties | Relative humidity at which material cakes at 25° C | % Ethyl alcohol held | % Phosphoric acid held |
|---|---|---|---|---|---|---|---|
| 10 D.E. Bulked Dextrin | .15 | very clear | slightly sweet | fair | 70 | 55 | 20 |
| 5 D.E. Bulked Dextrin | .08 | very clear | bland | good | 72 | 60 | 26 |
| Granular Starch | 4.7 | cloudy | grainy, cereal taste | poor for granulated starch | above 80 | 20 | not evaluated |
| 42 D.E. Dextrin | .68 | clear | sweet | poor | below 70 | 20 | not evaluated |
| Sucrose | .88 | clear | sweet | poor | not evaluated | 8 | not evaluated |
| Low D.E. Modified Dextrin | .63 | cloudy | bland with caromel note | excellent | 78 | 20 | 15 |
| Drum Dried starch of this invention with D.E. < 1 | .04 | clear | bland | excellent | above 78 | 70 | 32 |

The starch granules were thereafter separated by centrifugation and washing; then tray-dried at 50° C. On analysis by the NMR technique (nuclear Magnetic Resonance) the dry granule product was found to contain 0.5% of propylene oxide.

The product of the reaction was gelatinized by drum-drying 1 part water and 1 part of the modified starch granule in a drum dryer with drums pinched at a pressure of 80 psig and a speed of 6 RPM.

The dry powder produced is soluble in cold water and demonstrates improved bulk density, clarity in aqueous systems, taste, emulsifying and holding properties and viscosity over a majority of the best known carbohydrates as evidenced in Tables I and II. It should be noted that with regards to the viscosity of the dry granule product, the viscosity can be further reduced by heating at temperatures above about 160° C.

TABLE II

Relative Viscosities of Various Starches and Dextrins
All evaluations as to the relative viscosities of these
carbohydrates were made on 5% solutions maintained at 25° C

| Sample | Relative Viscosity Flow in Seconds |
|---|---|
| *Corn starch (gelatinized) | 530 |
| 42 D.E. dextrin | 129 |
| 10 D.E. dextrin | 131 |
| 5 D.E. dextrin | 134 |
| gelatinized modified starch with D.E. Less than 1 | 192 |
| Water | 124 |

*indicates that a 3% rather than a 5% system was tested.

It will be noted from the above Tables that none of the carbohydrates evaluated demonstrated the consistently superior ratings that the improved starch of this invention so demonstrated for every property tested. Generally, the gelatinized modified low D.E. starches of this invention have a significantly lower bulk density and better holding properties than low D.E. modified dextrins as well as an ability to produce clearer aqueous solution than the latter, for the low D.E. modified dextrins are considered to be one of the best starches in terms of their overall properties that are currently available.

The above examples and explanation are for the purpose of teaching those skilled in the art how to practice the invention. Upon reading the above disclosure, those skilled in the art will be aware of a number of modifications and variations. It is contemplated that these modifictions and variations be included within the scope of the present invention which is defined by the following claims.

We claim:
1. A process for producing a starch having the cold water solubility, low-hazing low viscosity and film-forming properties of a dextrin comprising:
   a. selecting a water insoluble granule starch having been hydrolyzed to a degree such that the starch has little or no reducing sugars present, has a DE of less than about 1 and when heated above a temperature of about 65° C, forms a clear, low viscosity solution;
   b. gelatinizing the modified granule starch without modification of the starch molecule; and
   c. drying the starch, the resultant starch material demonstrating a bland taste, low-hygroscopicity, low bulk density, low viscosity and film-forming properties in addition to the ability to both produce clear solutions and hold at higher levels numerous types of food materials.
2. The process of claim 1 wherein the granule starch is concurrently gelatinized and dried at temperatures above about 65° C.
3. The process of claim 2 wherein the granule starch is drum dried
4. The process of claim 2 wherein the granule starch is spray dried.
5. A process for producing a cold-water soluble low-hazing starch comprising:
   a. selecting an unmodified granule starch;
   b. partially hydrolyzing the starch to a D.E. of less than 1 such that the granule starch retains its insolubility in water;
   c. gelatinizing the modified starch without modification of the starch molecule; and
   d. drying the starch, the resultant gelatinized starch demonstrating a bland taste, low-hygroscopicity, low bulk density, low viscosity and the ability to both produce clear solutions and hold at higher levels numerous types of food materials.
6. The process of claim 5, wherein the modified starch is concurrently gelatinized and dried at temperatures above about 65° C.
7. The process of claim 6 wherein the modified starch is drum dried.
8. The process of claim 6 wherein the modified starch is spray dried.
9. The process of claim 5 wherein the granule starch is propoxylated to a level of about 0.5% prior to being hydrolyzed to a D.E. of less than about 1.
10. An improved starch composition having a low viscosity, lower hydroscopicity, lower bulk-density and better film-forming and holding properties than low D. E. dextrins comprising granule starches which have been hydrolyzed to a D. E. of less than about 1 with little or no reducing sugars being present while retaining their granule structure and gelatinized.
11. The composition of claim 10 wherein the improved starch is combined with a low calorie sugar substitute.
12. The composition of claim 11 wherein the sugar substitute is L-aspartyl-L-phenylalanine methyl ester.
13. The composition of claim 12 wherein the gelatinized modified starch has been dried to a bulk density of about 0.08 g bulk density/cc and L-aspartyl-L-phenylalanine methyl ester is employed therein at a concentration of about 4.75% so as to yield a bulked low calorie sweetening composition having a sweetness level equivalent to sucrose on a volume basis.
14. The composition of claim 12 wherein L-aspartyl-L-phenylalanine methyl ester is combined with other low calorie sugar substitutes.
15. The composition of claim 10 wherein the improved starch is in combination with an alcohol.
16. The composition of claim 10 wherein the improved starch is in combination with fat.

* * * * *

UNITED STATES PATENT AND TRADEMARK OFFICE
CERTIFICATE OF CORRECTION

PATENT NO. : 4,009,291
DATED : February 22, 1977
INVENTOR(S) : William A. Mitchell et al.

It is certified that error appears in the above-identified patent and that said Letters Patent are hereby corrected as shown below:

On the cover page, in the Abstract, first line, change "hydroscopicity" to -- hygroscopicity --; fourth line, change "hydrolyged" to -- hydrolyzed --.

In column 1, line 28, change "thab" to -- than --.

In column 2, line 21, change "a" to -- as --.

In column 3, line 45, change "starch" to -- starches --.

In column 4, last line, change "readly" to -- readily --.

In column 8, claim 10, second line, change "hydroscopicity" to -- hygroscopicity --.

Signed and Sealed this

Twenty-first Day of February 1978

[SEAL]

Attest:

RUTH C. MASON
Attesting Officer

LUTRELLE F. PARKER
Acting Commissioner of Patents and Trademarks